Patented Jan. 24, 1939

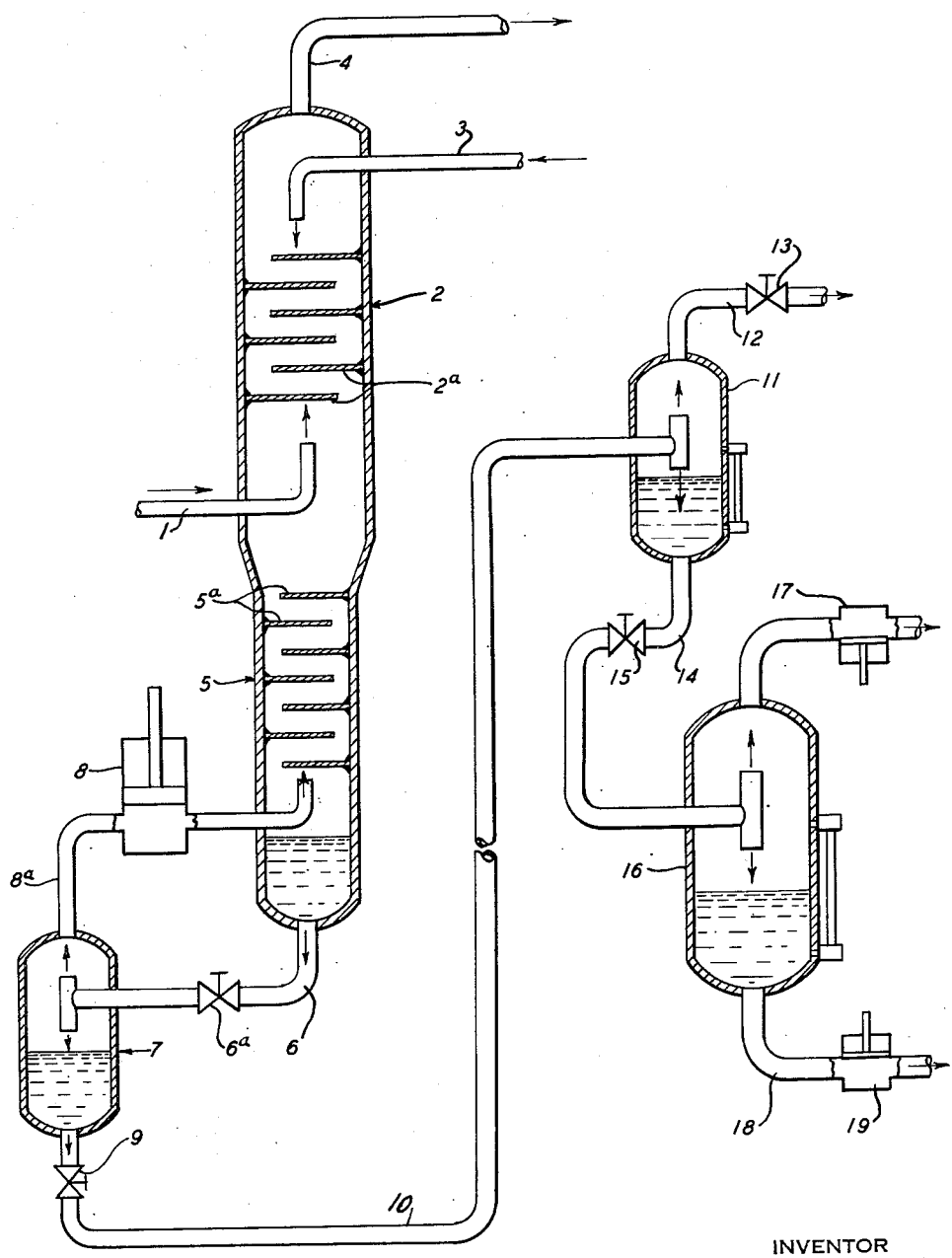

2,144,692

UNITED STATES PATENT OFFICE 2,144,692

PROCESS FOR THE SEPARATION OF GASEOUS MIXTURES

Paul Schuftan, Hollriegelskreuth, near Munich, Germany, assignor to The Linde Air Products Company, a corporation of Ohio Application March 27, 1936, Serial No. 71,230
In Germany April 4, 1935

7 Claims. (Cl. 260—679)

This invention relates to the separation of gaseous mixtures through washing, and particularly to an improved process for effecting the separation of gaseous mixtures by washing with solvents.

In the separation of gaseous mixtures by washing processes, the required separation can only be carried out with satisfactory completeness when washing mediums can be employed in which the gas components to be separated have widely different degrees of solubility. Such washing mediums, however, are not always available, and frequently their use is prohibited for technical or economical reasons. As a result, various processes have been proposed which, after an initial washing and absorption, effect a subsequent separation of the dissolved less soluble gas components from the more soluble gas components which are to be removed. For example, a separation of the less soluble components of a gaseous mixture has heretofore been attempted merely by washing the mixture with a suitable medium and then subsequently partially degasing the washing medium under an intermediate pressure. Such processes, however, are generally incomplete and are effected only with appreciable losses in yield of the more soluble component which is to be recovered.

It is, therefore, one of the principal objects of this invention to provide an improved washing process for the separation of gaseous mixtures which is not subject to the above-mentioned difficulties. Another object is to provide such a process by which it is possible to effect an extensive and substantially complete elimination of the dissolved, less soluble gas components from the washing medium, so that the more soluble gas components which are to be separated may be simultaneously recovered with the desired degree of purity and yield.

The above and other objects of this invention, together with the novel features which achieve these objects, will become apparent from the following description having reference to the accompanying drawing, which is a diagrammatic partly sectional view of one embodiment of apparatus adapted for carrying out the process of this invention.

In accordance with the present invention, the washing liquid after the initial steps of washing and absorption of the gaseous mixture, is partially degasified by expansion to a predetermined lower pressure, which pressure is selected so that the proportion of the more soluble gas component in the resulting cycle gas exceeds that in the original gaseous mixture. The cycle gas obtained by this partial degasification, or partial release of gas absorbed in the washing liquid, is recompressed to the pressure of the washing step and then conducted countercurrent to and in intimate contact with the washing medium after the initial washing and prior to the partial degasification.

It is well known that a gas may be entirely removed from solution in a liquid by bubbling a foreign gas through the liquid, since the bubbles furnish a space in which the partial pressure of the gas to be removed is at first zero. The bubbles thus receive the gas to be removed and carry it upward and out of contact with the portions of the solution they pass through.

When a mixture of two gases is bubbled through a solvent having both gases dissolved therein, gas of one kind will pass from solution into the bubble spaces if the partial pressure of that gas in the bubble space is lower than that pressure under which the dissolved gas and gaseous gas are in equilibrium. Thus, if the partial pressure of one of the two gases is increased while the total pressure is held constant, the partial pressure of the other gas is necessarily reduced and bubbles of gas having a reduced amount of the one gas will be enriched in that gas when passed through the solution, while at the same time the other gas will tend to be absorbed into the solution because the equilibrium between the gaseous and dissolved states has been destroyed in the other direction.

As a result of the increased partial pressure of the more soluble gas components in the cycle gas mixture provided in accordance with the present invention, the less soluble gas components are substantially eliminated from the wash liquid; while at the same time the more soluble components whose partial pressure in the cycle gas is increased, will become enriched in the washing medium. The portions of cycle gas resulting from the degasification of later portions of washing medium, which carry more of the more soluble components, thus become successively richer in these components, so that the efficiency of the separation process automatically increases until finally a permanent state is obtained in which the composition and volume of the cycle gas correspond substantially to the state of equilibrium at the intermediate expansion pressure in the degasifying chamber. The lower this pressure is maintained the greater will the volume of the cycle gas become, and the higher its content of the more soluble components. It will be apparent, however, that the lower the expansion pressure is maintained, the more power will be required for the subsequent recompression although the purity of the more soluble components to be recovered is increased. Finally, the ultimate recovery of the desired more soluble components may be accomplished by further degasifying the washing medium in one or more stages at lower pressures. If desired, a vacuum may be used in the last stage to obtain a complete recovery.

The process will be more readily understood by referring to the drawing, which shows, by way of an example, apparatus for the recovery of acetylene ($C_2H_2$) from a two-component mixture of acetylene and methane ($CH_4$), in which water is employed as the washing medium. Accordingly, 1600 cubic meters of such original gaseous mixture or initial gas, containing 85% methane by volume and 15% acetylene by volume, are compressed to a pressure of 15 atmospheres gage and introduced through a conduit 1 into the lower portion of a first stage wash tower 2, which is provided with suitable baffles or trays 2a. Simultaneously therewith 90 cubic meters of water are led into the upper portion of the wash tower 2 through a conduit 3, so that as the water flows down over the baffles 2a in intimate contact with the gas mixture, both methane and acetylene will be absorbed. The quantity of water employed is preferably sufficient to absorb all of the acetylene in the initial mixture, so that substantially pure methane will leave the top of the tower through an outlet conduit 4 leading therefrom to storage and consuming apparatus. The water thus saturated with the original gas mixture in proportion to the amount, solubilities and vapor pressures of each gas, leaves the lower portion of the tower 2 and passes directly into a second stage washing or separation tower 5, preferably located directly below the tower 2 and in free gas and liquid communication therewith, flowing down over suitable baffles or trays 5a disposed therein and leaving the tower 5 through a conduit 6 communicating with its lower end. An expansion valve 6a is provided in the conduit 6 and the saturated washing medium passes therethrough, to be expanded to an intermediate pressure of substantially 2.9 atmospheres gage into an intermediate pressure degasifier or gas separation chamber 7. In this manner substantially 60 cubic meters of an intermediate gas mixture or cycle gas is produced in the degasifier 7 which contains substantially 41% methane and 59% acetylene.

This cycle gas leaves the degasifier 7 through a conduit 8a and passes to a suitable compressor 8 where it is recompressed to the initial pressure of 15 atmospheres gage. The power required for the compressor 8 amounts to approximately 4% of the total power required for the washing process. The recompressed cycle gas is then led into the lower portion of the separation tower 5, where it passes upward in countercurrent flow to the saturated washing medium passing downward from the wash tower 2. As pointed out above, due to the change in partial pressures of the component gases, the less soluble component, which in the present example is methane, will be substantially removed from the liquid and pass upward; and simultaneously the washing medium will become enriched in the more soluble component, acetylene. Thus, by repeating the cycle of flow through the degasifier 7 and compressor 8, if such recycling is deemed necessary or desirable, substantially all of the methane will be removed from the washing liquid and a solution of acetylene only, in water, will be present in the bottom of the degasifier 7.

By conducting this solution in the chamber 7 through a suitable valve 9 into further degasifying apparatus, and in further still lower pressure stages, if necessary, it is possible to recover acetylene of 98% purity at a yield up to approximately 98% of the acetylene contained in the original gas mixture. For example, the liquid accumulating in the degasifier 7 and passed through the valve 9 may be conducted by means of a conduit 10 into a second degasifying chamber 11 operating at a lower pressure than the degasifier 7. This will release a portion of the acetylene which may pass out of the chamber 11 through a conduit 12 having a control valve 13 therein.

If desired, a still further step of degasifying may be practiced in which a vacuum is employed. Thus, the liquid collecting in the degasifier 11 is passed through a conduit 14, under the control of a valve 15, and into a final degasifying chamber 16. To maintain the vacuum on the liquid introduced into the chamber 16, a vacuum pump 17 is provided, which draws acetylene from the upper portion of the chamber and compresses it to the desired pressure for use. Water collecting in the degasifier 16 may be withdrawn through a conduit 18 leading to a force pump 19 which raises the pressure of the liquid to such a value that it may be used for washing other portions of the gaseous mixture.

If the separation tower 5 were eliminated and the washing liquid saturated with the original gas mixture in the tower 2 alone were degasified under an intermediate pressure of 2.9 atmospheres without leading back or recycling the resulting intermediate gas (which would contain 48% acetylene and be not introduced to a recond stage washing), an acetylene product of only 95% purity would be obtained by a final complete degasification of the washing liquid with a yield of only 90%. It is thus seen that the second stage of washing with recyling of the intermediate gas provides an important increase in purity and yield. By reducing the intermediate pressure in the degasifier 7 and increasing the volume of cycle gas correspondingly, it is possible to increase the purity of the acetylene to more than 99%, although the yield will remain substantially constant at about 98%.

Since temperature affects the solubilities of all of the gases in the solvent, it is desirable that the temperature of the washing medium and of the original and cycle gas mixtures should be controlled to have values at various stages of the process such that the desired effects are obtained. To this end heat exchanges may be employed for effecting the cooling of the materials being processed by utilizing the refrigeration developed when degasifying the solvent and the refrigeration of other cooling mediums.

It is obvious that the washing medium after being subjected to a final degasification to recover the desired product, may be returned to the wash tower at a desired point, for reuse with the advantage that any gases remaining therein will be conserved, and any refrigeration due to a lowered temperature may be utilized. When, however, degasification is effected by means of heat also, the liquid would need to be cooled to the desired washing temperature.

Under certain conditions it may be desirable to locate the separation tower 5 beside the wash tower 2, rather than below it as shown in the drawing. In such a case an additional pump or transferring means may be required to convey the saturated washing liquid leaving the tower 2 to the top of the tower 5.

The process is not limited to the embodiment described as an example but may be employed for separating gaseous mixtures of complicated compositions. Moreover, it is immaterial whether the object is to recover the more soluble components at a high purity or to prevent solution losses of the less soluble components. It is possible, for example, in washing out carbon dioxide from coke oven gas, or other combustible gases, to prevent solution losses of hydrogen which are very undesirable. Thus, a carbon dioxide product of high purity could be obtained so that further processing thereof would be profitable.

The present process can also be advantageously employed in the production of gas-oil components or hydrocarbon gases from coal distillation gases, which components or hydrocarbon gases are commonly stored in the liquid state. In such a process an organic solvent might be used as a washing medium, since it would eliminate the dissolved portions of such gases as methane, which appreciably increase the cylinder pressure or make necessary a special after treatment of the raw gas oil.

It will, of course, be understood that various other changes may be made in the hereindescribed novel process and apparatus without departing from the principle of the present invention or sacrificing any of its advantages.

I claim:

1. Process for the separation of gaseous mixtures having at least two components which comprises compressing said mixture to a predetermined washing pressure; washing said mixture by passing in counter-current contact with a relatively large quantity of a liquid solvent in which the components of the mixture have relatively low but different solubilities to form a solution containing a greater proportion of at least one of said components; effecting counter-current contact between said solution and a cycle gas mixture in a second stage of washing while under a pressure substantially equal to said predetermined washing pressure; and forming said cycle gas mixture by partially expanding to an intermediate pressure said solution after the second stage of washing, separating the solution from the gases released by the expansion, compressing to said washing pressure the gases released by the expansion, and introducing the compressed cycle gas into said second stage, whereby an accumulative enrichment in said solution of the more soluble component with simultaneous displacement therefrom of the less soluble components is effected.

2. Process for the separation of gaseous mixtures having at least two components according to claim 1 which includes the steps of further expanding said solution and separating the more soluble component therefrom at a relatively high degree of purity.

3. Process for the separation of gaseous mixtures having at least two components of limited solubility in water, one component of which is substantially more soluble in water, which comprises compressing the mixture to a predetermined washing pressure; washing such mixture with a relatively large amount of water so as substantially to saturate the water with the least soluble of said component gases; passing at least a portion of such saturated water into a zone of reduced pressure so as to release portions of the dissolved gases therefrom to provide a cycle gas mixture having an increased proportion of the more soluble components; separating said cycle gas from the solution; recompressing such cycle gas mixture to the predetermined washing pressure; introducing such recompressed mixture in a second stage of counter-current washing with another portion of the saturated washing water prior to its passage into said zone of reduced pressure; and passing washing water from said zone of reduced pressure into a degasifier for separating desired portions of the more soluble component from the water.

4. Process for the separation of a mixture of methane and acetylene, which comprises washing such mixture under a predetermined initial pressure with water, so as substantially to saturate such water with the methane; subjecting to a reduced pressure at least a portion of the thus saturated water for releasing a cycle gas mixture having an increased proportion of acetylene; separating the cycle gas mixture and the solution; recompressing such cycle gas mixture to the initial pressure; and washing such recompressed cycle gas mixture in a second stage of counter-current contact with another portion of the saturated washing water prior to reducing the pressure thereof.

5. Process for the separation of a gaseous mixture containing 85% methane and 15% acetylene by volume, which comprises compressing such mixture to a pressure of 15 atmospheres gage; washing such compressed mixture with water in sufficient quantities to dissolve all of the acetylene; passing at least a portion of such gas-bearing water into a zone of intermediate pressure at substantially 2.9 atmospheres gage, for releasing a gaseous mixture having a substantially greater proportion of acetylene than methane; separating the released mixture from the water; recompressing such released mixture to the initial pressure of 15 atmospheres; and washing such recompressed gas mixture in counter-current contact with another portion of the gas-bearing water solution prior to reducing the pressure thereof, so as to displace methane therefrom and simultaneously enrich such solution in acetylene.

6. Process for preventing solution losses of hydrogen from a gas mixture including combustible gases, hydrogen and carbon dioxide, which comprises washing such mixture with a water; reducing the pressure acting on at least a portion of such gas-bearing water so as to release a cycle gas mixture having an increased proportion of carbon dioxide; separating the cycle gas mixture from the solution and passing the resultant cycle gas mixture, after recompression to the initial washing pressure, in counter-current contact with another portion of the gas-bearing water solution prior to reducing the pressure thereof so as to enrich such solution in carbon dioxide and displace the other gases therefrom.

7. Process for the production of hydrocarbon components from coal distillation gases which comprises washing such gases with an organic solvent in which the constituents of said gases have a relatively low degree of solubility and in which the hydrocarbon components are more soluble than the remaining components; subjecting to a reduced pressure at least a portion of such gas-bearing washing solvent so as to release a cycle gas mixture having an increased proportion of the hydrocarbon components; separating the cycle gas mixture from the solution and passing the resultant cycle gas mixture, after recompression to the initial washing pressure, in counter-current contact with another portion of the gas-bearing washing solvent prior to reducing the pressure thereof so as to enrich such solvent in the hydrocarbon components and displace the other gases therefrom.

PAUL SCHUFTAN.